United States Patent

[11] 3,588,890

| [72] | Inventors | Ronald W. Cox;<br>Arthur L. Anderson, Kokomo, Ind. |
|---|---|---|
| [21] | Appl. No. | 829,462 |
| [22] | Filed | June 2, 1969 |
| [45] | Patented | June 28, 1971 |
| [73] | Assignee | General Motors Corporation<br>Detroit, Mich. |

[54] RESISTANCE SENSING SUPERVISORY SYSTEM
3 Claims, 3 Drawing Figs.

[52] U.S. Cl............................................. 340/409,
340/411
[51] Int. Cl....................................................G08b 29/00
[50] Field of Search........................................... 340/409,
411, 214

[56] References Cited
UNITED STATES PATENTS
791,961   6/1905   Weatherly.................... 340/409

3,120,758   2/1964   Craddock.................... 340/411
3,478,352   11/1969   Eisenberg.................... 340/409

Primary Examiner—Thomas B. Habecker
Attorneys—William S. Pettigrew and C. R. Meland ABSTRACT: A supervisory system is provided for monitoring a plurality of remote stations from a central station. A supervisory circuit located at each of the remote stations is connected with a corresponding monitoring circuit located at the central station through a pair of conductors. The supervisory circuits each include a switching device operable between an opened position and a closed position. A control circuit located at the central station and connected to each of the monitoring circuits detects closed switch, opened switch, ground, short circuit and open circuit conditions existing in each of the supervisory circuits located at the remote stations. In addition, the control circuit detects a failure of any one of the system components.

PATENTED JUN 28 1971 3,588,890

INVENTORS
Ronald W. Cox &
BY Arthur L. Anderson

C. L. Meland
ATTORNEY

RESISTANCE SENSING SUPERVISORY SYSTEM

DISCLOSURE

This invention relates to a supervisory system for monitoring a plurality of remote stations from a central station located away from the remote stations.

Normally, a switching device operable between opened and closed positions is located at each of the remote stations across a pair of conductors connecting the remote station to the central station. Hence, there are five possible conditions of interest which may occur at each of the remote stations. First, the switching device may be in the closed position. Second, the switching device may be in the opened position. Third, one of the conductors may be grounded. Fourth, one of the conductors may be open circuited. Fifth, the conductors may be short circuited together. The present invention proposes a supervisory system for monitoring all of the five conditions which may exist at each of the remote stations with minimum circuitry and maximum reliability.

According to one aspect of the invention, the five separate conditions which may exist at the remote stations are each represented by a different corresponding voltage level. In general, this is accomplished by providing a plurality of supervisory circuits each located at a different one of the remote stations and each connected to a different one of a plurality of monitoring circuits located at the central station through a different one of a plurality of pairs of the conductors. The supervisory circuits each include a first sensing resistance connected in series with a switching device and a second sensing resistance connected in parallel with the switching device. The monitoring circuits each include a voltage divider network having at least two detecting resistances connected in series. The supervisory circuits are each connected across one of the detecting resistances of the associated one of the monitoring circuits thereby to establish a signal voltage across the other one of the detecting resistances. The signal voltage produced by each of the monitoring circuits has a different corresponding level depending upon which of the five possible conditions exists in the associated one of the supervisory circuits located at the remote stations.

In another aspect of the invention, the level of the signal voltage produced by each of the monitoring circuits is sensed and recorded so as to provide an indication of the precise condition of each of the associated supervisory circuits located at the remote stations. Generally, this is accomplished by providing a control circuit located at the central station and connected to each of the monitoring circuits. The control circuit includes an address device which sequentially samples the signal voltage produced by each of the monitoring circuits. A voltage generator produces a reference voltage having various levels. A comparator produces an output signal when the level of the reference voltage exceeds the level of the signal voltage. An indicator device senses the level of the reference voltage at the time an output signal is produced by the comparator. Hence, the control circuit successively determines the condition of each of the supervisory circuits located at the remote stations.

According to a further aspect of the invention, a failure of any one of the system components results in a fault indication. In general, this is accomplished by providing the various levels of the reference signal such that the continuous absence of an output signal from the comparator indicates either a grounded condition in the associated one of the supervisory circuits or a system component failure, and the continuous presence of an output signal from the comparator indicates either a shorted condition in the associated one of the supervisory circuits or a system component failure. Hence, the system is essentially fail-safe.

In yet another aspect of the invention, spurious high frequency noise signals induced within the pair of conductors are prevented from influencing the level of the signal voltage. Generally, this is accomplished by providing a capacitance connected in parallel with the one of the detecting resistances across which the signal voltage is established so as to form an RC filter for attenuating the high frequency noise signals.

These and other aspects of the invention will become more apparent by reference to the following detailed description of a preferred embodiment when considered in conjunction with the accompany drawing, in which.

Figure 1:
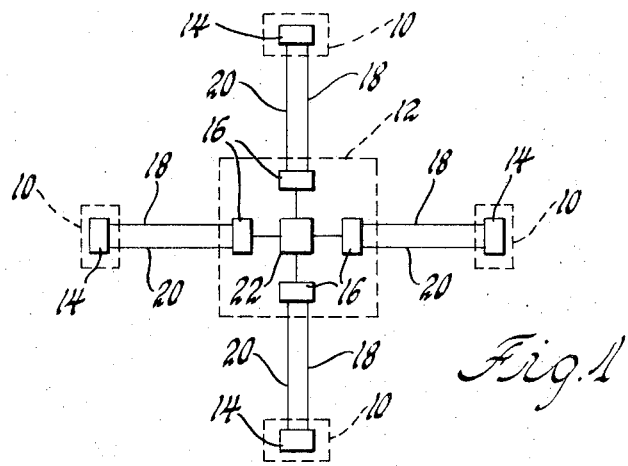
FIG. 1 is a schematic diagram of a supervisory system incorporating the principles of the invention.

FIG. 1 discloses a supervisory system for monitoring a plurality of remote stations 10 from a central station 12 located away from the remote stations 10. A plurality of supervisory circuits 14 are each located at a different one of the remote stations 10. A plurality of monitoring circuits 16 are each located at the central station 12. A plurality of pairs of conductors 18 and 20 each connect a different one of the supervisory circuits 14 with a different associated one of the monitoring circuits 16. A control circuit 22 is located at the central station 12 and is connected to each of the monitoring circuits 16. The control circuit 22 successively senses and records the condition of each of the supervisory circuits 14 as detected by the associated one of the monitoring circuits 16. Obviously, the illustrated system may employ as many supervisory circuits 14 and monitoring circuits 16 as there are remote stations 10 to be monitored.

Figure 2:
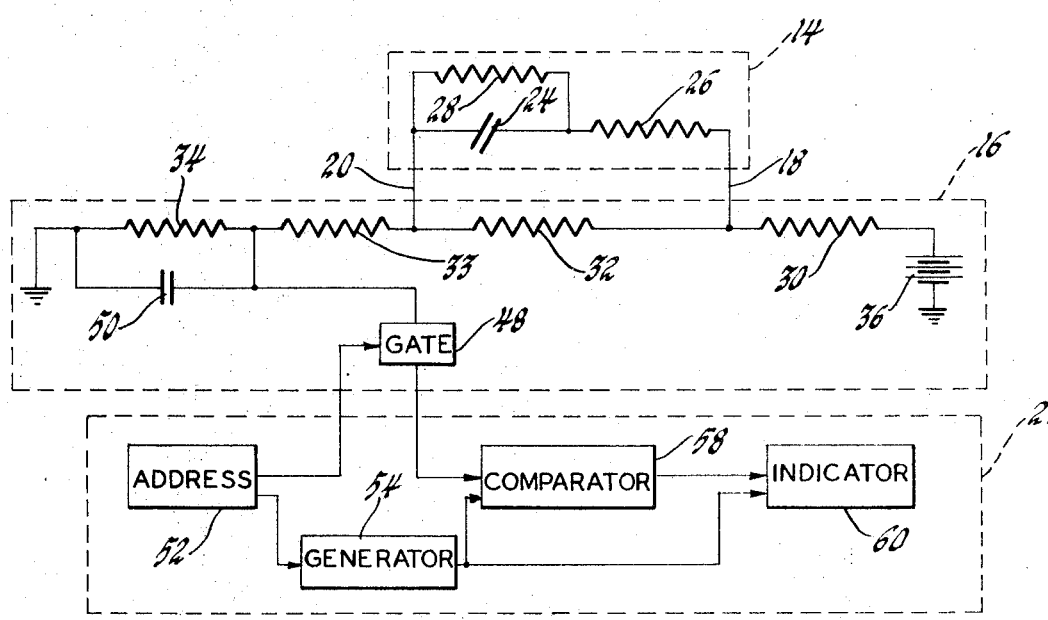
FIG. 2 is a schematic diagram of a portion of the supervisory system illustrated in FIG. 1.

FIG. 2 discloses a portion of the supervisory system illustrated in FIG. 1 including a supervisory circuit 14 connected to a monitoring circuit 16 by a pair of conductors 18 and 20. The supervisory circuit 14 includes a pair of switching contacts 24 operable between an opened position and a closed position in response to some supervised event. The supervised event may be any phenomena capable of being represented by the relative position of the switching contacts 24. As an example, the switching contacts 24 may be automatically operated by a fire detection device or manually operated by security personnel on normal patrol duty.

The supervisory circuit 14 further includes a first sensing resistor 26 connected in series with the switching contacts 24 and a second sensing resistor 28 connected in parallel with the switching contacts 24. Accordingly, the resistance presented between the conductors 18 and 20, across the supervisory circuit 14, varies depending upon the position of the switching contacts 24. Hence, one value of resistance is presented when the switching contacts 24 are in the opened position so as to effectively connect the resistor 28 in series with the resistor 26. Conversely, a different value of resistance is presented when the switching contacts 24 are in the closed position so as to effectively shunt the resistor 28.

The monitoring circuit 16 includes a voltage divider network provided by first, second, third and fourth detecting resistors 30, 32, 33 and 34 connected between a suitable voltage source 36 and ground. The voltage source 36 may conveniently be provided by a conventional battery. The conductors 18 and 20 connect the supervisory circuit 14 across the second detecting resistor 32. Thus, the effective resistance appearing across the second resistor 32 is directly related to the resistance presented by the supervisory circuit 14 between the conductors 18 and 20. Further, the voltage appearing across the fourth detecting resistor 34 is an inverse function of the effective resistance appearing across the second detecting resistor 32. Therefore, the voltage appearing across the fourth detecting resistor 34 is responsive to the condition of the supervisory circuit 14 thereby to provide a signal voltage.

Figure 3:
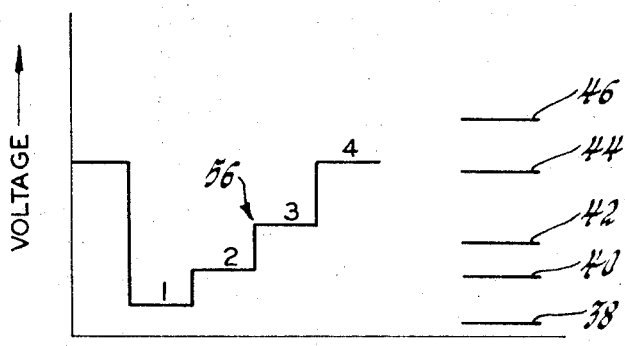
FIG. 3 is a graph of a series of voltage levels useful in explaining the operation of the portion of the supervisory system illustrated in FIG. 2.

FIG. 3 illustrates the relative levels of the signal voltage developed across the resistor 34 for each of the five possible conditions which may exist in the supervisory circuit 14. It will be observed that the signal voltage is at a first level 38 when one of the conductors 18 and 20 is grounded. The signal voltage is at a second higher level 40 when one of the conductors 18 and 20 is open circuited. The signal voltage is at a third higher level 42 when the switching contacts 24 are in the opened position. The signal voltage is at a fourth higher level 44 when the switching contacts 24 are in the closed position. Finally, the signal voltage is at a fifth higher level 46 when the conductors 18 and 20 are short-circuited together. The first level 38 is slightly higher than ground due to the small voltage drop provided by the conductors 18 and 20.

Referring again to FIG. 2, the monitoring circuit 16 also includes a gate 48 which is connected between the third and fourth detecting resistors 33 and 34 to receive the signal voltage. A capacitor 50 is connected across the fourth detecting resistor 34 to provide an RC filter. The capacitor 50 shunts high frequency noise to ground around the fourth detecting resistor 34 thereby to prohibit the noise from influencing the level of the signal voltage established across the resistor 34. The first detecting resistor 30 provides a resistance for the voltage source 36 when the conductor 18 is grounded. The third detecting resistor 33 restricts the level of the signal voltage to a range suitable for utilization by the control circuit 22.

The control circuit 22 includes an address device 52 connected to the gate 48 and to a voltage generator 54. Simultaneously, the address device 52 activates the gate 48 to apply the signal voltage from the monitoring circuit 14 to the control circuit 22, and energizes the voltage generator 54 to initiate a staircase reverence voltage 56 as shown in FIG. 3. The reference voltage 56 includes successively higher voltage levels 1 through 4. A comparator 58 is connected to the gate 48 to receive the signal voltage and is connected to the voltage generator 54 to receive the reference voltage 56. The comparator 58 produces an output signal when the level of the reference voltage 56 exceeds the level of the signal voltage which may be any one of the levels 38 through 46 depending upon the condition of the supervisory circuit 14. An indicator device 60 is connected to the comparator 58 to receive the output signal and to the voltage generator 54 to receive the reference voltage 56. The indicator device 60 senses and records the level of the reference signal 56 when an output signal is received from the voltage comparator 58.

It will be readily appreciated that the level of the reference voltage 56 sensed by the indicator device 60 represents the condition of the supervisory circuit 14. For example, if the switching contacts 24 in the supervisory circuit 14 are in the opened position, the signal voltage defined by the fourth detecting resistor 34 and the monitoring circuit 16 is at the level 42. Thus, the comparator 58 produces an output signal when the reference voltage 56 reaches the level 4 which is greater than the level 44 of the signal voltage. Hence, the indicator device 60 senses and records the level 4 of the reference voltage 56 in response to the occurrence of the output signal from the comparator 58 thereby indicating that the switching contacts 24 in the supervisory circuit 14 are in the opened position. It is to be noted that the reference voltage 56 need not be a staircase voltage but may be any suitable voltage having a unidirectionally varying level, such as a ramp voltage.

It will also be observed that when the signal voltage is at the level 38, indicating a grounded condition in the supervisory circuit 14, an output signal from the comparator 58 is continuously present since the level of the reference voltage 56 never falls below the level 38 of the signal voltage. Conversely, when the signal voltage is at the level 46, indicating a shorted condition in the supervisory circuit 14, an output signal from the comparator 58 is continuously absent since the level of the reference voltage 56 never rises above the level 46 of the signal voltage. Further, if any one of the system components of the supervisory circuit 14, the monitoring circuit 16, or the control circuit 22 should fail, the comparator 58 will necessarily either continuously produce an output signal or continuously not produce an output signal. Accordingly, the indicator device 60 will interpret the performance of the comparator 58 as indicative of either a grounded condition or a shorted condition in the supervisory circuit 14. Thus, the indicator device 60 yields a fault indication in response to the failure of any one of the system components. Therefore, the illustrated supervisory system is essentially fail-safe.

In a supervisory system having a plurality of supervisory circuits 14 and associated monitoring circuits 16, the address device 52 is connected to the gates 48 in each of the monitoring circuits 16. In such case, the address device 52 sequentially activates the gates 48 in each of the monitoring circuits 16. Thus, the indicator device 60 senses and records the condition of each of the supervisory circuits 14 as the gates 48 in the associated monitoring circuits 16 are activated by the address device 52.

In a supervisory system constructed in accordance with the preferred embodiment of the invention illustrated in FIG. 2, the following circuit components were found to yield satisfactory results:

| | |
|---|---|
| Resistor 26 | 15 K. ohms |
| Resistor 28 | 6.2 K. ohms |
| Resistor 30 | 820 ohms |
| Resistor 32 | 27 K. ohms |
| Resistor 33 | 4.3 K. ohms |
| Resistor 34 | 1.5 K. ohms |
| Capacitor 50 | 1.0 microfarads |
| Voltage Source 36 | 20 volts |

It is to be understood that the preferred embodiment of the invention disclosed herein is shown for illustrative purposes only and that various alternations and modifications may be made thereto without departing from the spirit and scope of the invention. Thus, the illustrated control circuit 22 may taken any of a variety of configurations well known to those skilled in the art. Ordinarily, the exact configuration of the control circuit 22 will be determined by the precise requirements of each particular application.

In the illustrated control circuit 22, the gate 48 and the address device 52 may be provided by suitable logic elements well known to those skilled in the art. The voltage generator 54 may be provided by any conventional staircase voltage generator, such as a ladder network coupled with a bank of sequentially operated switches. The comparator 58 may conveniently take the form of a conventional differential amplifier. The indicator device 60 may be provided by any suitable circuit capable of indicating the level of the reference voltage 56 at the time an output signal is received from the comparator 58. For example, a plurality of flip-flops may be each connected in series between a control gate and a different related one of a series of indicator lamps. The indicator lamps may be energized when related ones of the flip-flops are in the set state. The control gate may be connected to the generator 54 for applying the reference voltage 56 to the flip-flops and may be connected to the comparator 58 for interrupting the application of the reference voltage 56 to the flip-flops in response to an output signal from the comparator 58. A voltage divider network may be connected across the input of each of the flip-flops so as to cause a different one of the flip-flops to switch to the set state in response to each different level of the reference voltage 56 thereby to energize the related one of the indicator lamps. Thus, when the control gate interrupts the application of the reference voltage 56 to the flip-flops, the illuminated ones of the lamps yield an indication of the level of the reference voltage 56 thereby to indicate the condition of the corresponding one of the supervisory circuits 14. The flip-flops may be each connected to the address device 52 so as to be reset by each succeeding address signal.

We claim:

1. A supervisory system for monitoring a plurality of remote stations from a central station located away from the remote stations, comprising: a plurality of supervisory circuits each located at a different one of the remote stations and including, a switching device operable between an opened position and a closed position, a first sensing resistance connected in series with the switching device, and a second sensing resistance connected in parallel with the switching device; a plurality of monitoring circuits each located at the central station and including, a source of voltage, and at least two detecting resistances connected in series across the source of voltage; a plurality of different pairs of conductors each connecting a different one of the supervisory circuits across one of the detecting resistances of a different associated one of the monitoring circuits thereby to establish a signal voltage across the other one of the detecting resistances, the signal voltage having a different predetermined level when the switching means is in the opened position, when the switching means is in the closed position, when one of the conductors is grounded, when one of the conductors is open circuited, and when the conductors are short circuited together; and a control circuit located at the central station and connected to each of the monitoring circuits for determining the level of the control voltage provided by each of the monitoring circuits thereby to indicate the condition of each of the associated supervisory circuits located at the remote stations.

2. A supervisory system for monitoring a plurality of remote stations from a central station located away from the remote stations, comprising: a plurality of supervisory circuits each located at a different one of the remote stations and including, a switching device operable between an opened position and a closed position, a first sensing resistor connected in series with the switching device, and a second sensing resistor connected in parallel with the switching device; a plurality of monitoring circuits each located at the central station and including, a source of voltage, and at least two detecting resistors connected in series across the source of voltage; a plurality of different pairs of conductors each connecting a different one of the supervisory circuits across one of the detecting resistors of a different associated one of the monitoring circuits thereby to establish a signal voltage across the other one of the detecting resistors, the signal voltage having a first level when one of the conductors is grounded, a second greater level when one of the conductors is open circuited, a third greater level when the switching means is in the opened position, a fourth greater level when the switching means is in the closed position, and a fifth greater level when the conductors are short circuited together; a plurality of capacitors each connected in parallel with the one of the detecting resistors across which the signal voltage is established in a different one of the monitoring circuits for shunting spurious noise signals around the detecting resistor thereby to prohibit the noise signals from influencing the level of the signal voltage; and a control circuit located at the central station and connected to each of the monitoring circuits for determining the level of the control voltage provided by each of the monitoring circuits thereby to indicate the condition of each of the associated supervisory circuits located at the remote stations.

3. A supervisory system for monitoring a plurality of remote stations from a central station located away from the remote stations, comprising: a plurality of supervisory circuits each located at a different one of the remote stations and including, a switching device operable between an opened position and a closed position, a first sensing resistance connected in series with the switching device, and a second sensing resistance connected in parallel with the switching device; a plurality of monitoring circuits each located at the central station and including, a source of voltage, and at least two detecting resistances connected in series across the source of voltage; a plurality of different pairs of conductors each connecting a different one of the supervisory circuits across one of the detecting resistances of a different associated one of the monitoring circuits thereby to establish a signal voltage across the other one of the detecting resistances, the signal voltage having a first level when one of the conductors is grounded, a second greater level when one of the conductors is open circuited, a third greater level when the switching means is in the opened position, a fourth greater level when the switching means is in the closed position, and a fifth greater level when the conductors are short circuited together, the signal voltage also having approximately either the first level or the fifth level when any one of the system components has failed; a plurality of gates each connected with the other one of the detecting resistances in a different one of the monitoring circuits to receive the signal voltage for passing the signal voltage when activated; and a control circuit located at the central station and including, generator means for producing a reference voltage having a unidirectionally varying level when energized, address means connected to each of the gates in the monitoring circuits and to the generator means for successively activating each of the gates and simultaneously energizing the generator means, comparator means connected to each of the gates in the monitoring circuits to receive the signal voltage and connected to the generator means to receive the reference voltage for producing an output signal when the level of the reference voltage exceeds the level of the signal voltage, and indicator means connected to the comparator means to receive the output signal and to the generator means to receive the reference voltage for determining the level of the reference voltage in response to the occurrence of the output signal thereby to successively indicate the condition of each of the supervisory circuits located at the remote stations and thereby to also indicate the failure of any one of the system components.